United States Patent [19]

Sankey et al.

[11] Patent Number: 4,545,199
[45] Date of Patent: Oct. 8, 1985

[54] FAN CASCADE REVERSER HAVING DUAL BLOCKER DOORS

[75] Inventors: Edward M. Sankey, Santee; Randall J. Seaver, Chula Vista, both of Calif.

[73] Assignee: Rohr Industries, Inc., Chula Vista, Calif.

[21] Appl. No.: 617,174

[22] Filed: Jun. 4, 1984

Related U.S. Application Data

[63] Continuation-in-part of Ser. No. 387,770, Jun. 14, 1982, abandoned.

[51] Int. Cl.⁴ .............................................. F02K 3/06
[52] U.S. Cl. ..................................... 60/226.2; 60/228; 60/229; 239/265.29; 239/265.31; 239/265.37; 244/110 B
[58] Field of Search .................. 60/226.2, 230, 228, 60/229; 244/110 B; 239/265.19, 265.25, 265.29, 265.31, 265.33, 265.37

[56] References Cited

U.S. PATENT DOCUMENTS

| | | | |
|---|---|---|---|
| 3,262,270 | 7/1966 | Beavers | 60/226.2 |
| 3,500,645 | 3/1970 | Hom | 60/206.2 X |
| 3,503,211 | 3/1970 | Medawar et al. | 60/226.2 X |
| 3,511,055 | 5/1970 | Timms | 60/229 |
| 3,541,794 | 11/1970 | Johnston et al. | 239/265.29 X |
| 3,601,992 | 8/1971 | Maison | 60/230 X |
| 3,612,401 | 10/1971 | Ellis | 239/265.29 |
| 4,005,822 | 2/1977 | Timms | 239/265.31 |
| 4,147,028 | 4/1979 | Rodgers | 239/265.29 X |
| 4,216,926 | 8/1980 | Lawson | 60/226.2 X |

Primary Examiner—Carlton R. Croyle
Assistant Examiner—Jeffrey A. Simenauer
Attorney, Agent, or Firm—Patrick J. Schlesinger; Frank D. Gilliam

[57] ABSTRACT

A thrust reversing system for controlling the fan gases from a thrust producing aircraft engine. The system comprises a first group of blocker doors surrounding the upper longitudinal portion of the engine fan duct; a second group of blocker doors positioned rearward of the first group surrounding the entire engine fan duct; mechanism is provided for translating an upper movable fairing and a lower sleeve section which during translating provides an upwardly directed opening from the fan duct through gas-directing cascades and deploys the blocker doors from a stowed duct wall lining position to a deployed fan gas blocking deployed position.

9 Claims, 7 Drawing Figures

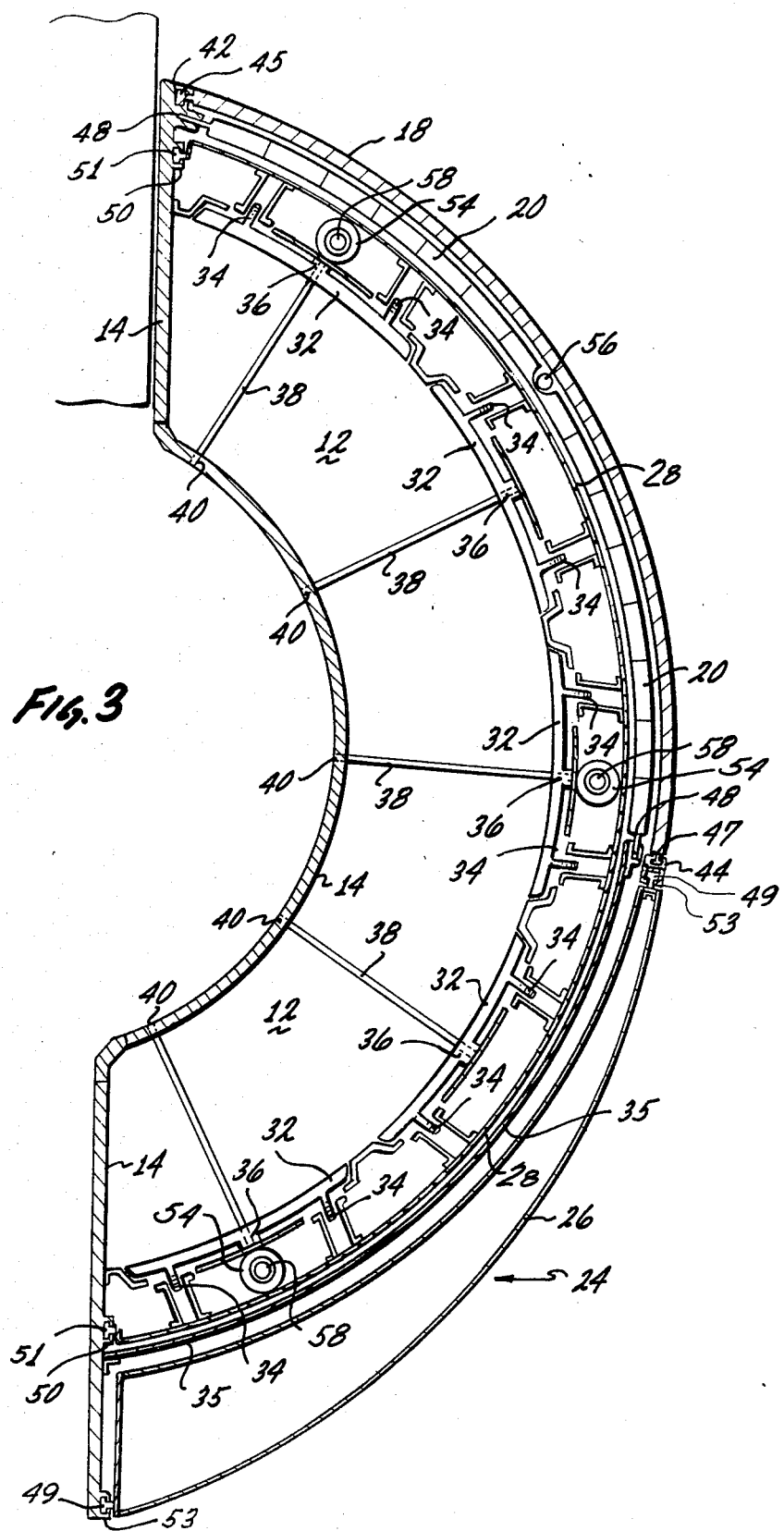

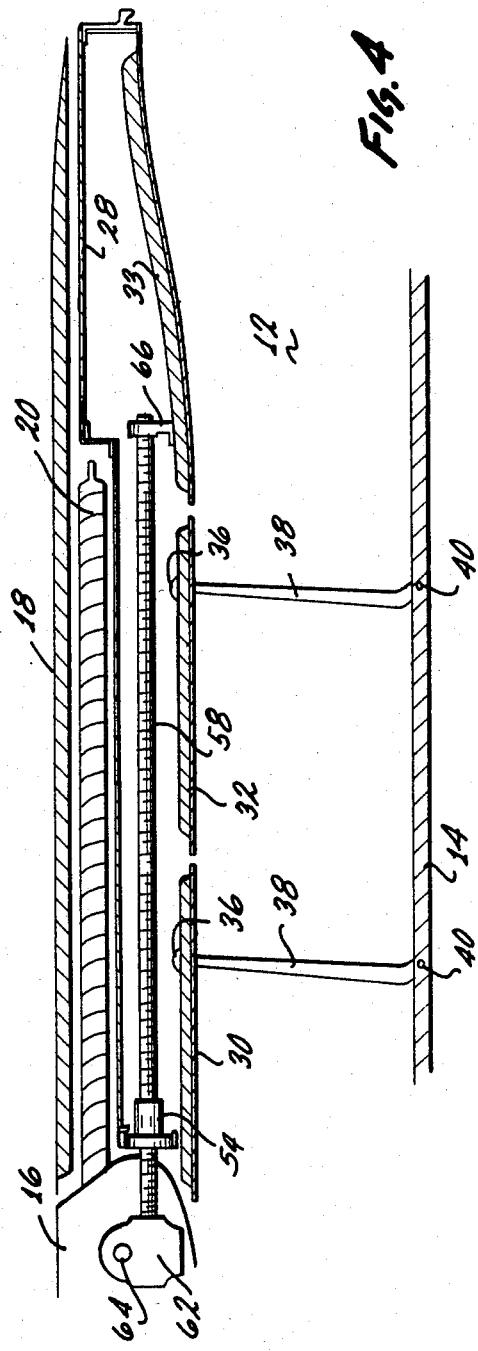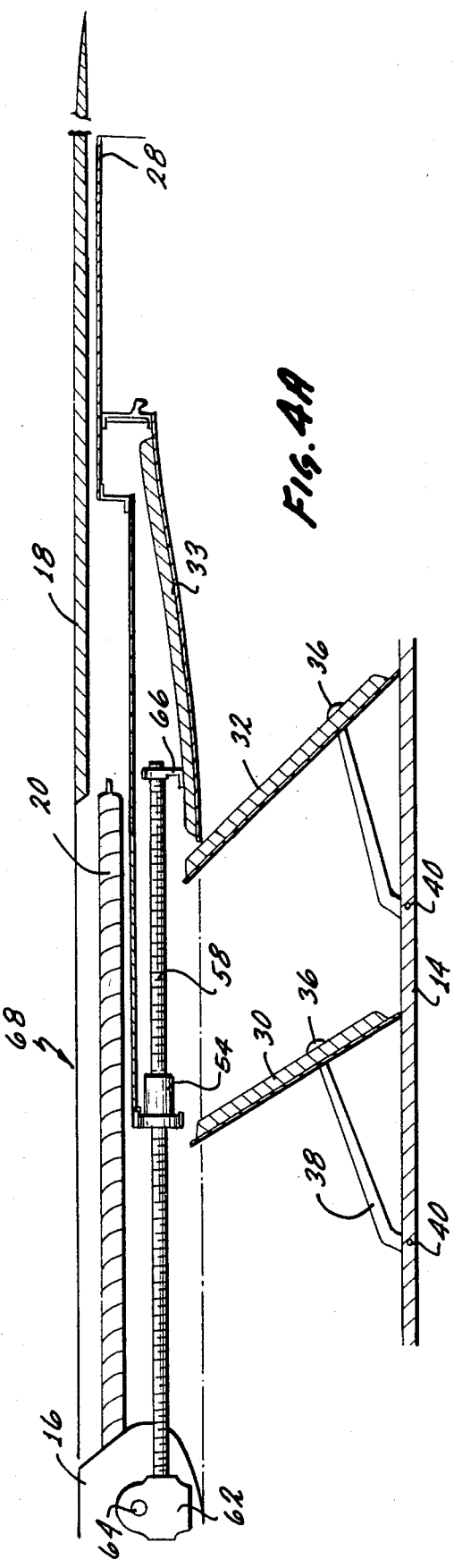

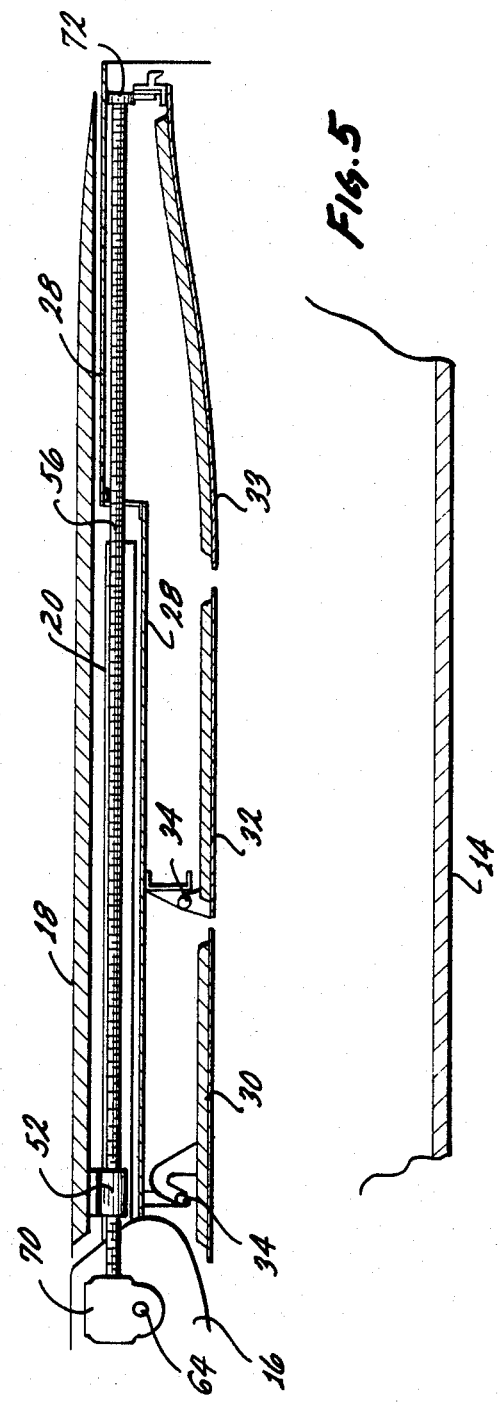
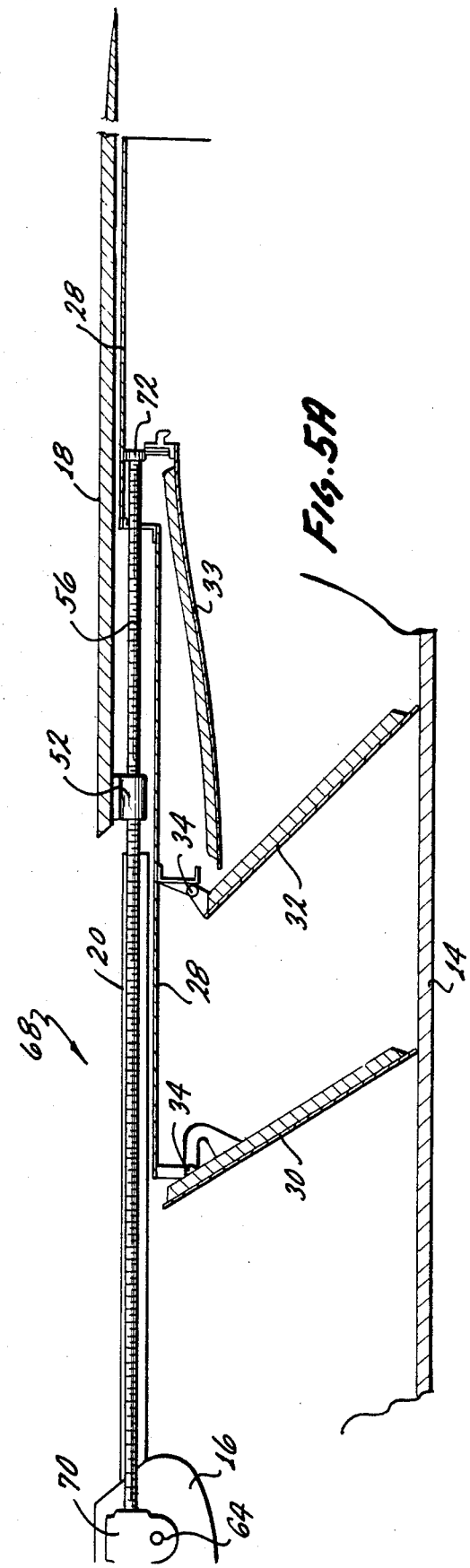

FAN CASCADE REVERSER HAVING DUAL BLOCKER DOORS

BACKGROUND OF THE INVENTION

This application is a continuation-in-part of pending application having Ser. No. 387,770, filed June 14, 1984, now abandoned.

The invention relates generally to an improvement in thrust reversers for redirecting the normal flow of engine fan gases in a substantially reversed direction and, more specifically, but not by way of limitation, to a reversing system for aircraft engines which directs the reversed gases through only the upper portion of the engine, thereby preventing the ingestion of reversed gases into the engine air intake as a result of landing surface impingement and the blowing of dust and foreign objects during landing and backing of aircraft on the ground.

In general, the thrust reversing concepts of the prior art were directed to the blocking of rearwardly directed gases and redirecting those gases forward through an opening surrounding substantially the entire engine including the bottom portion thereof. Such prior art devices have been suitable for the purposes intended; however, when the aircraft on which they were installed were adjacent to or in contact with the ground during aborted take-offs, landings and ground manuvering, use of the prior art thrust reversers at high power levels and low aircraft speeds caused ingestion of reversed gases into the engine air intake, thereby resulting at times in damage to the engine rotating machinery. In addition to ingesting the considerable dust and hot exhaust gases that would be present in the immediate area of the aircraft, the reversed gases could blow about foreign objects from the ground thereby causing injury to nearby people and damage to other aircraft, etc.

SUMMARY OF THE INVENTION

The present invention is intended to obtain the various benefits of the prior art devices and further to include means for substantial elimination of the problems of engine ingestion of reversed gases and dust and blowing about foreign objects when landing, taking off or ground manuvering.

The reverser system of the instant invention comprises a forward fixed position fairing surrounding the engine, a rearwardly translatable fairing surrounding the upper longitudinal portion of the engine, which translatable fairing forms a streamlined continuation of the forward positioned fairing when in a forwardmost translated or stowed position, a fixedly positioned fairing surrounding the lower longitudinal portion of the engine in a forward fairing abutting relationship and a translatable sleeve having inner and outer spaced apart walls along the lower longitudinal portion of the engine. A first set of blocker doors are pivotly attached to the translating sleeve surrounding the upper longitudinal portion of the engine. A second set of blocker doors positioned rearwardly of the first blocker doors and surround the entire engine are pivotly attached likewise to the translating sleeve. A synchronized mechanism is provided for translating the translatable fairing at substantially twice the speed of the translatable sleeve between their stowed and deployed positions.

When the translatable fairing and the sleeve are translated from a stowed to a deployed position, an opening to the atmosphere is formed between the forward fixed position fairing and the translatable fairing around the upper longitudinal portion of the engine forward of the first blocker doors. The doors are caused to rotate to a reversing position whereby the fan gases are directed from the fan duct through the opening formed to the atmosphere. As aforementioned, the translating mechanism is synchronized by driving both the fairing and the sleeve by a common motor means through separate gear trains whereby the fairing and sleeve translate simultaneously with the fairing translating at substantially twice the distance as the sleeve during a given time so that the desired fan gas exit area match can be achieved. A fixed position cascade array is positioned in the opening to further direct in a predetermined manner the gases exiting therethrough.

A principal object of this invention is to provide fan gas reversing from only the upper longitudinal portion of the engine, thereby preventing the undesirable ingestion of reversed gases and ground matter into the engine air intake and the blowing of dust and foreign objects during takeoff, landing and ground manuvering of the aircraft when the reverser is deployed.

Another object of the invention is to maintain a desired fan gas exit area match in any fan duct blocking position of the reverser blocker doors.

These and other objects of the invention will become apparent from the following description taken together with the accompanying drawings.

BRIEF DESCRIPTION OF THE DRAWINGS

FIG. 3 is a half section showing of the mechanism of FIG. 1 taken along line 3—3;

FIG. 4 is a showing taken along line 4—4 of FIG. 2, depicting the translatable sleeve in a stowed position;

FIG. 4A is a showing taken along line 4—4 of FIG. 2, depicting the translatable sleeve in a fully deployed position;

FIG. 5 is a showing taken along line 5—5 of FIG. 2, depicting the translatable fairing in a stowed position; and FIG. 5A is a showing taken along line 5—5 of FIG. 2, depicting the translatable fairing in a deployed position.

DETAILED DESCRIPTION OF THE PREFERRED EMBODIMENT

Throughout the figures and description, the same numerals are used to identify the same or similar elements.

The term "upper longitudinal engine portion" means generally the upper half of the engine, which portion can extend below the engine longitudinal center line and the "lower longitudinal engine portion" means generally the lower half of the engine, which portion may not extend to the engine longitudinal center line.

Figure 1:
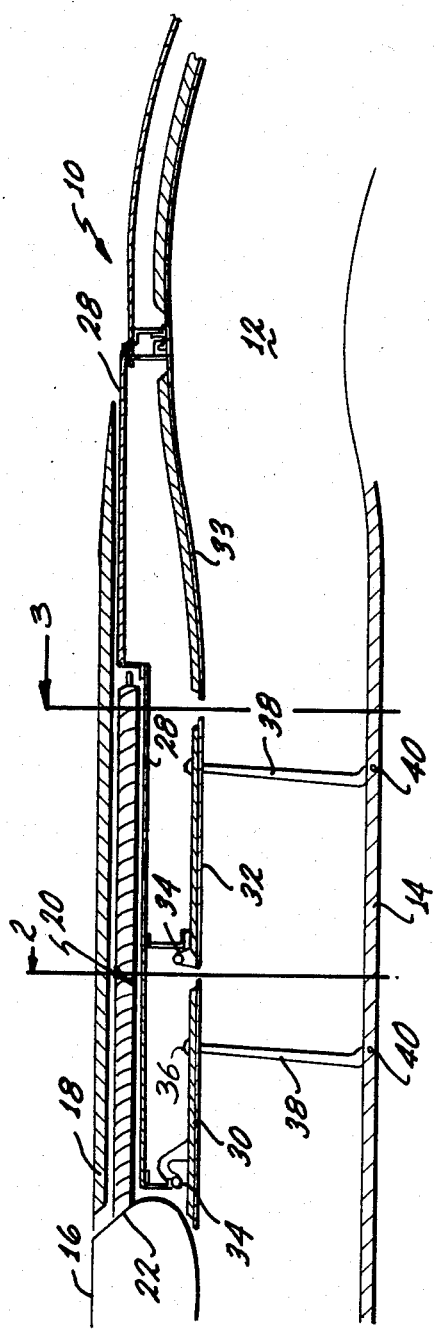
FIG. 1 is a simplified cutaway partial side view of the rear portion of an aircraft engine nacelle, showing the exhaust gas reversing mechanism of the instant invention.
Figure 1:
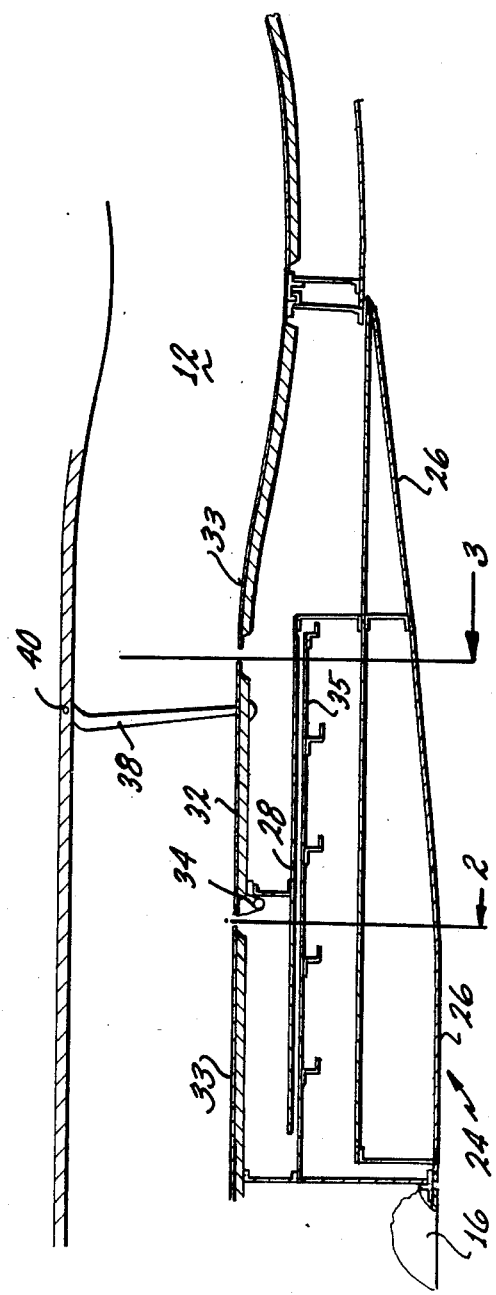
Figure 2:
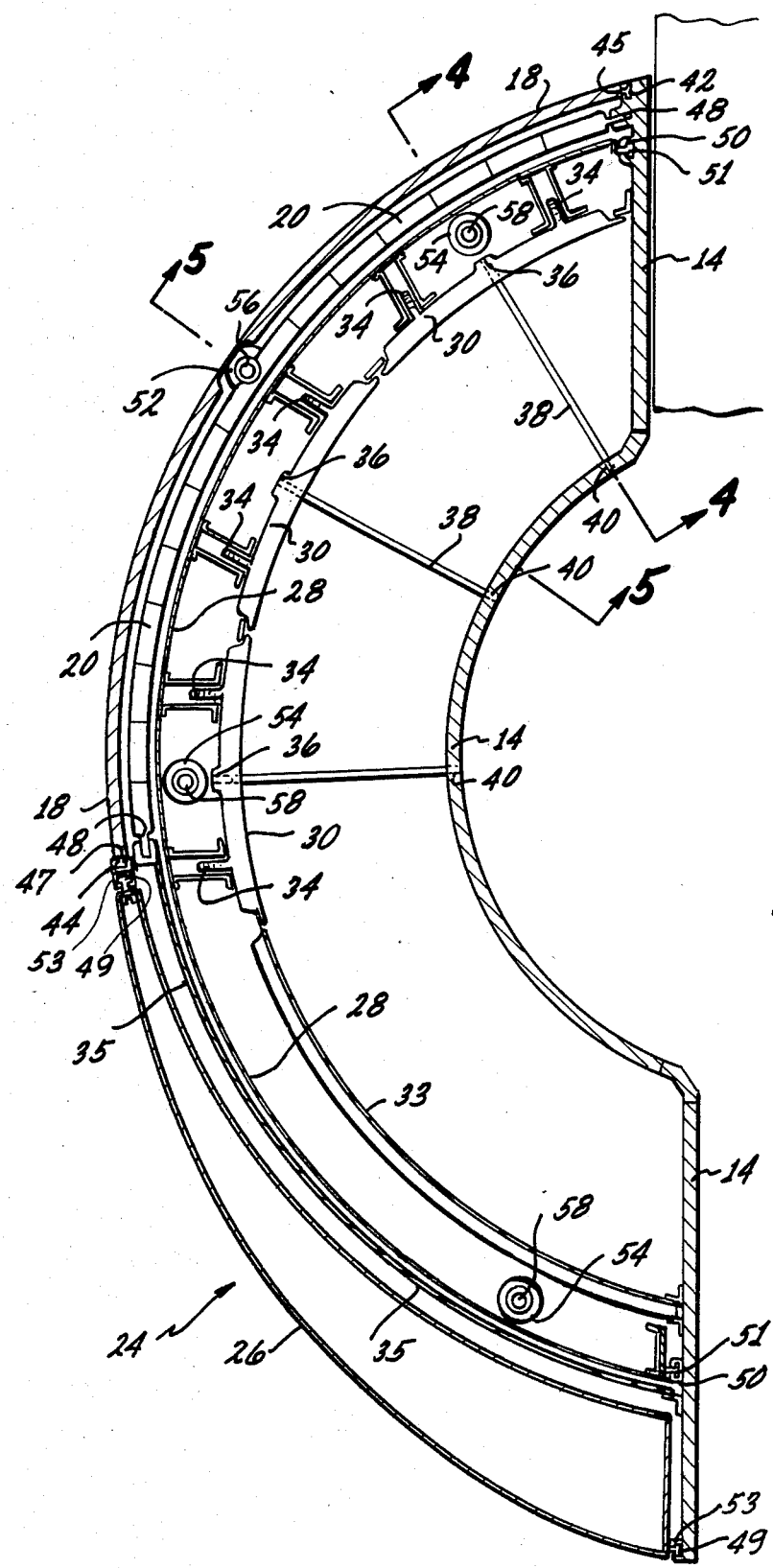
FIG. 2 is a half section showing of the mechanism of FIG. 1 taken along line 2—2.

Referring now to the drawings in detail and in particular to FIG. 1, the reference character 10 generally designates one embodiment of a thrust-producing engine nacelle constructed in accordance with the present invention. The engine nacelle 10 for an engine 11 includes a fan duct 12 bounded by an inner fan duct wall 14. A fixed forward fairing 16 is attached to fixed aircraft structure, not shown for ease of illustration, and forms a portion of the forward portion of the engine nacelle 10. Positioned rearwardly of the upper portion of the forward fairing 16 is a translatable fairing 18. Located beneath the translatable fairing 18 is an arcuate fixed-in-position cascade assembly 20. As seen in FIGS. 2 and 3, the fairing 18 is made in right and left hand portions which act together as one element when the nacelle 10 is assembled. For ease of understanding the fairing 18 will be referred to as a single element. This cascade assembly 20 is secured along its forward surface 22 to the rearmost lip of the fixed fairing 16, at its upper surface to the inner fan duct wall 14, and at its lower surface to a fixed lower portion sleeve 35 (see FIG. 2). An aft lower portion non-translatable fairing 24 includes a lower outer surface portion 26 which forms a streamlined continuation of the outer surface of the lower portion of the fixed-in-position fairing 16 and also includes an inner translatable sleeve portion 28 which carries two sets of blocker doors 30 and 32. As before, the non-translatable fairing 24 comprises left and right hand portions which cooperate together to form a single non-translatable fairing 24. The first forward set of blocker doors 30 surround the upper longitudinal portion of the engine fan duct 12 and when they are in a stowed position (see also FIGS. 2, 4 and 5) form a portion of the outer fan duct wall along with the inner surface of fixed sleeve 33 of the fan duct 12. The second set of blocker doors 32, positioned rearwardly from the first set of blocker doors 30, circumferentially surround the entire fan duct and, like doors 30, form a portion of the outer wall of the fan duct 12 when in a stowed position. Each of the blocker doors 30 and 32 is pivotly attached at a leading edge to a hinge 34 on the inner sleeve portion 28, and is attached at point 36 intermediate its leading and trailing edges to a drag link 38. Each drag link 38 is pivotly attached at its opposite end to a predetermined location 40 along the inner fan duct wall 14.

Referring now specifically to FIG. 2, this figure shows a cutaway vertical half section of the nacelle assembly 10 shown in FIG. 1 taken along line 2—2. The inner fan duct wall 14 extends between the upper translatable fairing 18, at its upper engine portion, and the lower non-translatable fairing 24, at the lower engine portion. The upper translatable fairing 18 is carried and guided by inner fan duct wall track 42 and translatable sleeve track 44, which tracks capture and guide the fairing attachments 45 and 47. The cascade assembly 20, as hereinbefore discussed, is fixedly attached to the fixed fairing 16, to the fan duct wall 14 and to a fixed sleeve 35 through suitable tongue and groove attachments 48. The lower non-translatable fairing 24 is provided with suitable attachments 49 at its end margins, which attachments 49 are fixedly captured by connectors 53. The inner translatable sleeve 28 is carried by inner fan duct wall tracks 50 of duct wall 14 at two spaced-apart upper and lower locations through sleeve attachments 51. Ball nuts 52 and 54, hereinafter discussed in more detail, are attached, respectively, to the translatable fairing 18 and the translatable sleeve 28 as a part of their translating mechanisms. The pivotal attachments 40 of the drag links 38 are located in a spaced apart relationship on the inner fan duct wall 14 to provide for closure of the forward blocker doors 30.

Referring now specifically to FIG. 3, there is shown a cutaway vertical half section of the engine assembly of FIG. 1 taken along line 3—3. The rear set of blocker doors 32 substantially surround the entire engine. Actuator shafts 56 are provided for driving the fairing 18 and actuator shafts 58 are provided for driving the inner sleeve portion 28.

It should be understood that the opposite halves of the vertical sections of FIGS. 2 and 3 are mirror images of the halves shown.

Referring now specifically to FIGS. 4 and 4A, these figures depict the translatable sleeve drive system in stowed and fully deployed positions respectively. A gear box 62 is driven by a rotating flex shaft 64 which is driven by a motor means, not shown, that rotates the actuating ball shaft 58, which in turn causes the translatable sleeve 28, whose inner surface is attached to the ball nut 54, to translate along the ball shaft 58. The ball shaft 58 is rotatably attached at one end to gear box 62 and at the other end to fixed sleeve 33 through support journal 66. In the showing of FIG. 4A, the ball nut 54 has been translated aft by ball shaft 58 rotation to a substantially maximum aft or fully deployed translatable sleeve position 28. The actuation of the fairing 18 will be hereinafter explained in detail. The opening 68 along the upper longitudinal portion of the engine is now exposed for allowing fan gases, now blocked to rearward flow, to exit therethrough. The cascade assembly 20 positioned within the opening 68 further directs the exiting gases in a predetermined manner.

Referring now specifically to FIGS. 5 and 5A, these figures depict the translatable fairing 18 drive system in stowed and fully deployed positions respectively. A gear box 70 is, like gear box 62, driven by the common flex shaft 64. The gear box 70 in turn drives the ball shaft 56, which engages ball nut 52. The ball shaft 56 is rotatably attached at one end to gear box 70 and journaled to fixed sleeve 33 at its other end in bearing support 72. In the showing of FIG. 5A, the ball nut 52 has been translated by rotation of ball shaft 56 to a substantially maximum aft or fully deployed translatable fairing position.

The gearing of gear boxes 62 and 70 is such that at their common input rotational speed, namely, that of flex shaft 64, the fairing 18 will be translated substantially twice the distance of the translatable sleeve portion 28 for given span of time. This feature achieves fan gas exit area matching during either deployment or stowing of the reverser doors. As can be readily seen in FIGS. 2 and 3, the ball shafts 56 and 58 do not lie on a common plane. In order to drive ball shafts 56 and 58 by a common flex shaft 64, referring now to FIGS. 4, 4A, 5 and 5A, the gear boxes are oppositely positioned; that is, in FIGS. 5 and 5A, the drive shaft 64 engages a lower portion of the gear box 70 and in FIGS. 4 and 4A, the drive shaft 64 engages the upper portion of the gear box 62. In this manner the common drive shaft 64 engages each gear box along the same vertical plane.

OPERATION

A drive motor, not shown, commonly known in this art, for example those driven by electricity, hydraulics, pneumatics or the like provides rotational forces to the common flex drive 64, which in turn provides rotation to the gear boxes 62 and 70. As can be seen, the lower longitudinal engine portion has no fan duct opening to atmosphere as does the upper portion. The cross-sectional effective area of opening 68 must always be at least equal to the cross-sectional effective area of the fan duct nozzle before thrust reverser actuation to provide fan gas exit area match and eliminate any engine back pressure as a result of the blocker door actuation. In order to insure area match of the fan duct area 12, which is gradually closed as the blocker doors 30 and 32 rotate into the fan duct 12 to the opening 68, the fairing 18 must translate twice the distance traversed by the deployed translatable sleeve portion 28. As aforementioned, this is accomplished by the different gearing of the gear boxes 62 and 70.

The rotation of the gears in the gear boxes 62 and 70 causes their respective associated shafts to rotate, thereby translating the ball nuts 52 and 54 in a synchronized manner, and causing translation of fairing 18 and translatable sleeve position 28, which in turn causes blocker doors 30 and 32 to rotate into or out of the fan duct.

It will be apparent to those skilled in the art that many modifications and variations may be effected without departing from the spirit and scope of the novel concepts of the present invention.

What is claimed is:

1. In a thrust reversing system for controlling fan gases from a fan jet engine carried by an aircraft, said engine having upper and lower longitudinal sections comprising:

a forward positioned fixed fairing having inner and outer walls;

an inner duct wall carried exterior to said engine and an outer duct wall, spaced therefrom for forming a fan duct with said forward positioned fairing;

a rearwardly translatable fairing positioned adjacent said engine upper longitudinal section that abuts said forward fixed fairing along its upper longitudinal section, forming a streamlined continuation thereof when in a stowed position and exposing an upwardly directed opening therebetween when in a deployed position;

a fixed sleeve surrounding the lower longitudinal section of said engine in an abutting relationship with said fixed fairing;

a translatable sleeve adjacent to the lower and upper longitudinal sections of the engine forming continuation of the fixed fairing inner wall portion whereby, in a stowed position, the translatable sleeve abuts said fixed fairing and when deployed, exposes said opening to said fan duct;

first and second sets of blocker doors circumferentially carried by said translatable sleeve, said first set of blocker doors positioned forward of said second set of blocker doors and surrounding the upper longitudinal section of said fan duct and said set of second blocker doors substantially surrounding the entire engine whereby, in a stowed position, said sets of doors form a portion of the outer wall of said fan duct, in a partially deployed position of the thrust reverser system direct a portion of said fan gases through said opening and in a fully deployed position direct substantially all of the fan gases through said opening; and translating means for translating said rearwardly translatable outer fairing and said translatable sleeve.

2. The invention as defined in claim 1 wherein said opening has a fixed cascade assembly positioned therein.

3. The invention as defined in claim 1 wherein link means interconnect each of said blocker doors with said inner duct wall causing said doors to rotate toward said inner duct wall and away from said outer duct wall when said translatable sleeve is translated between its stowed and deployed positions.

4. The invention as defined in claim 1 wherein the cross-section of the upper longitudinal section is greater than a semi-circle.

5. The invention as defined in claim 2 wherein a cascade assembly is secured to and supported by said fixed sleeve to preclude fan gases exiting downwardly when the translatable sleeve is translated rearwardly.

6. The invention as defined in claim 1 wherein said translating means comprise gear boxes which translate said translatable fairing at a speed greater than the translation of said translatable sleeve.

7. The invention as defined in claim 6 wherein said translating means comprises a single drive means driving a common flex shaft through gearing means so as to cause said translatable fairing to travel approximately twice the distance of said translatable sleeve in the same time.

8. The invention as defined in claim 1 wherein said translatable means comprises linear actuators.

9. The invention as defined in claim 8 wherein said linear actuators are ball actuators.

* * * * *